United States Patent

[11] 3,612,414

| [72] | Inventors | James M. Nevison<br>Fareham;<br>Ronald Leslie Smallbone, Havant, both of<br>England |
|---|---|---|
| [21] | Appl. No. | 27,228 |
| [22] | Filed | Apr. 10, 1970 |
| [45] | Patented | Oct. 12, 1971 |
| [73] | Assignee | Kenwood Manufacturing (Working)<br>Limited<br>Havant, Hampshire, England |
| [32] | Priority | May 29, 1969 |
| [33] |  | Great Britain |
| [31] |  | 27370/69 |

[54] COFFEE MILL
5 Claims, 3 Drawing Figs.

[52] U.S. Cl. ...................................................... 241/36,
146/68 A
[51] Int. Cl. ........................................................ B02c 18/12
[50] Field of Search ........................................... 241/33, 36,
63, 100; 146/36, 68, 68 A; 259/108

[56] References Cited
UNITED STATES PATENTS

| 1,141,358 | 6/1915 | Portmann ..................... | 146/68 A X |
| 2,664,982 | 1/1954 | Orzabal ........................ | 146/68 A X |
| 2,982,483 | 5/1961 | Heinemans ................... | 241/36 X |
| 3,493,022 | 2/1970 | Mantelet ...................... | 146/68 |

FOREIGN PATENTS

| 1,078,637 | 5/1954 | France ......................... | 241/36 |

*Primary Examiner*—Granville Y. Custer, Jr.
*Attorney*—Kirschstein, Kirschstein, Ottinger & Frank ABSTRACT: A domestic appliance, such as a coffee mill, comprising a fixed casing within which a spring is positioned to support an axially movable drum. A shaft to which a cutter is attached, is rotatably mounted in a floor of the drum. The spring serves to hold the shaft out of engagement with a drive motor coupling. The drum is provided with a lid which preferably is lockable to the casing. When the lid is properly in place the force exerted by the spring is overcome and the drum and thereby the shaft are depressed so that the shaft engages the drive motor coupling.

PATENTED OCT 12 1971

INVENTORS
JAMES MICHAEL NEVISON
RONALD LESLIE SMALLBONE
BY
ATTORNEY

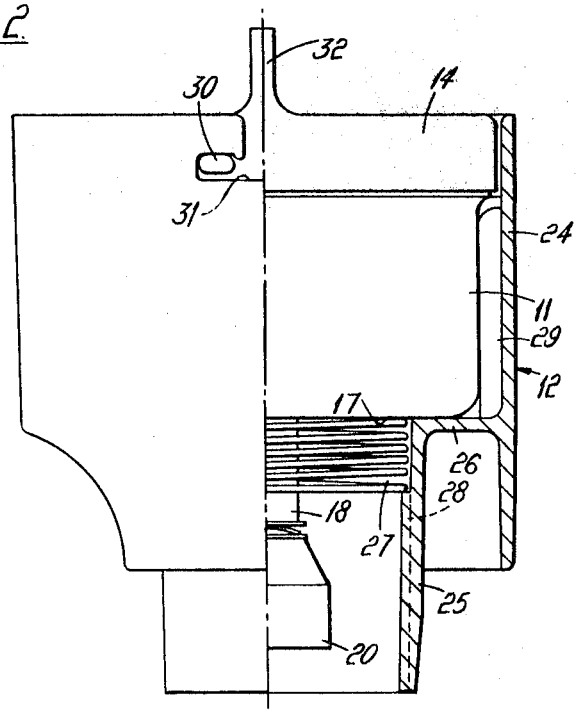
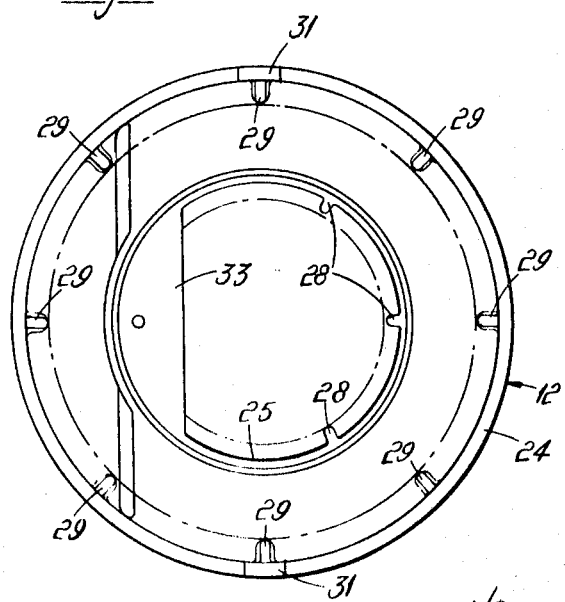

COFFEE MILL

The present invention relates to domestic appliances.

Domestic appliances, for example, coffee mills or liquidizers, include a fixed housing having at its upper end a removable lid, and at its lower end a rotatable blade or cutter which may be driven by a motor. Such a housing may be provided with its own motor, or may be attachable for example to the auxiliary drive of a domestic mixing machine.

According to the present invention there is provided a domestic appliance comprising a casing, a drum which is axially slidable within the casing, a lid for the drum, a driven shaft rotatably mounted in a floor of the drum, a coupling member on an end of the driven shaft remote from the floor, a resilient member disposed between the casing and the drum to urge the drum from the casing, whereby in use, when the lid is properly in place, the coupling member is in engagement with a cooperating external coupling member, and when the lid is not properly in place, or is removed, the resilient member acts on the drum to disengage the coupling member from the external coupling member.

Preferably the lid is lockable to the casing, for example by lugs provided on either the lid or the casing which are engageable with bayonet sockets formed in the other part. The construction of the present invention effectively forms a clutch or coupling, which is only engaged when the lid is in place on the housing. It will be appreciated that with such a construction, a great safety advantage is achieved in so far as it is less likely for a user to be hurt, if the cutter or blade can only be driven when the lid is in place.

In order that the invention may more readily be understood, the following description is given, merely by way of example, reference being made to the accompanying drawings, in which:

FIG. 2 is an elevation partly in section of a second embodiment of the invention; and FIG. 3 is a top plan view of the external casing with the lid and internal parts removed.

Figure 1:
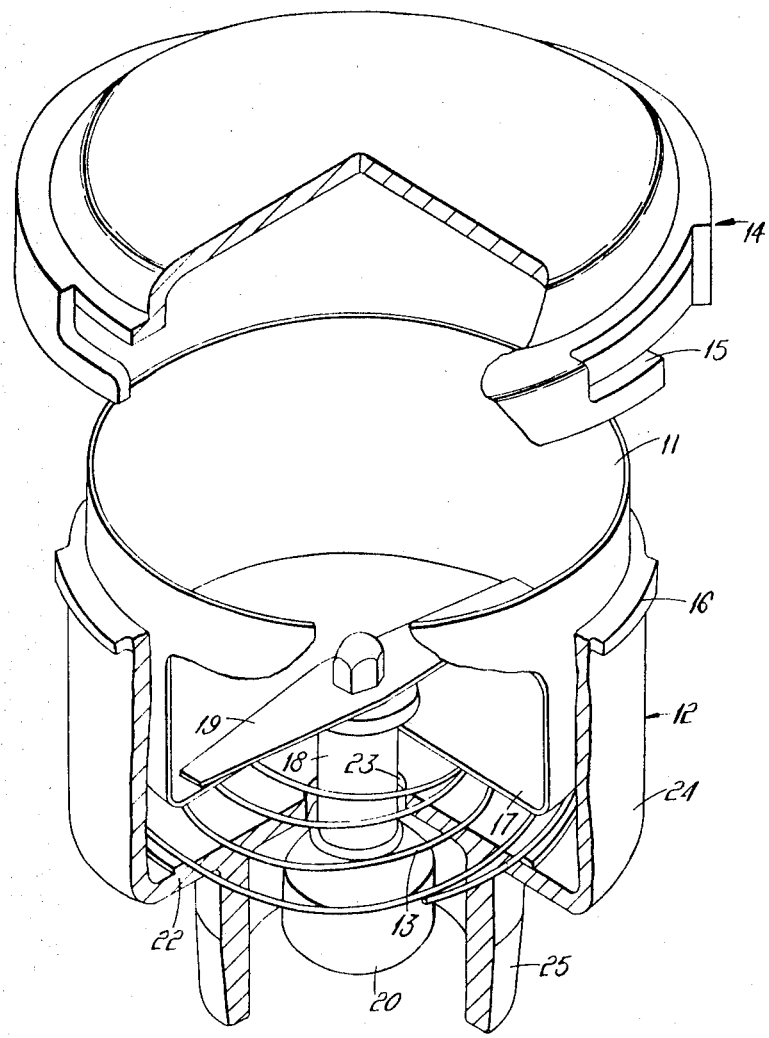
FIG. 1 is an exploded schematic view, partly in section, of one embodiment of domestic appliance made in accordance with the invention.
Figure 1:
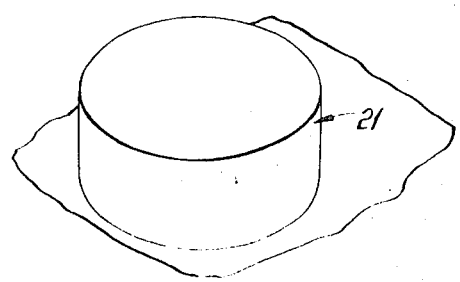

In FIG. 1 there is illustrated one form of coffee mill according to the invention. This comprises an inner drum 11 which is axially slidable in an outer casing 12, the drum being urged resiliently upwardly by a spiral spring 13 located between an abutment in the form of a circular wall 22 of the casing 12 and a floor 17 of the drum 11. As shown in FIG. 1 the casing comprises a large-diameter cylindrical section 24 and a small-diameter cylindrical section 25 having their adjacent ends interconnected by the wall 22 so that they are coaxial. Mountable on the casing 12 is a lid 14 provided with bayonet recesses 15 positioned to engage lugs 16 on the casing 12 to lock the lid in place. The casing 12 and the lid 14 are preferably made of a moulded plastics material.

Rotatably mounted in the floor 17 of the drum 11, on its driven shaft and bearing assembly 18, is a cutter 19 in the form of a rotatable blade. The driven shaft 18 which passes through an orifice 23 in the wall 22 includes a suitable driven coupling member 20, which is positioned to engage a cooperating drive coupling member 21 connected to the shaft of a drive motor (not shown) or to the auxiliary drive of a domestic mixing machine. Preferably the coupling members 20, 21 are resiliently connected to the shaft 18, but if desired the coupling members may comprise the end faces of the drive and driven shafts.

In use of the above-described coffee mill, the mill is fitted onto its own power motor, or on to the auxiliary drive of a mixing machine, and at this instant the driven coupling member 20 is spaced from the drive coupling member 21, so that even if the drive coupling 21 is rotated, no rotation of the cutter will occur. When coffee has been put into the coffee mill the lid 14 is put on and rotated, so that the recesses 15 engage with the lugs 16 to hold the lid in place. The act of putting the lid in place forces the drum 11 downwardly, against the action of the spring 13, so that the two coupling members 20, 21 are engaged and drive can be transmitted to the cutter 19.

The same arrangement could equally well be employed for other attachments for a domestic mixing machine, for example a liquidizer. If desired, any other suitable means may be provided for urging the drum 11 upwardly with respect to the housing, although the form of spring illustrated is particularly suitable. If desired a brake surface associated with the driven coupling 20 could cooperate with a further brake surface carried by the casing 12, so that when the lid is removed, the cutter is positively braked to slow the cutter rapidly.

FIGS. 2 and 3 illustrate a second embodiment of a coffee mill to that shown in FIG. 1. For the convenience of description, the parts of the FIGS. 2 and 3 embodiment which correspond to similar parts of the FIG. 1 embodiment have been referenced with the same number. The moulded plastics casing 12 as before comprises the coaxially arranged large and small cylindrical sections 24 and 25 but in this embodiment they are interconnected by an annular wall 26 which leaves the bore of the small section unobstructed except for a segment 33 (FIG. 3). The segment 33 serves to locate the casing 12 when it is placed over the drive-coupling member 21 (FIG. 1). The drum 11 is resiliently urged upwardly by a helical spring 27 which is supported on an abutment comprising the upper surface of the segment 33 and a series of ribs 28, for example, three ribs formed integrally with and around a portion of the inside of the wall of the small-diameter section 25. The lid 14 of the drum 11 in this embodiment is adapted to fit over the drum 11 only. The outside diameter of the lid 14 is smaller than the inside diameter of the large-diameter section 24 so that the drum 11 complete with the lid 14 are axially slidable in the casing 12. A plurality of equally spaced ribs 29, for example eight ribs are formed integrally with the inside wall of the casing 12, these ribs 29 serve to centralize the drum 11 in the casing. Lugs 30 are formed in diametrically opposite positions of the lid 14 which are engageable with bayonet sockets or recesses 31 provided in the casing 12. A handle 32 is formed in the lid 14 to facilitate the locking of the lugs 30 in their respective recesses 31. The cutter (not shown) and the driven shaft and bearing assembly 18 are mounted in the floor 17 of the drum 11. Also driven coupling member 20 is provided but unlike the FIG. 1 embodiment the coupling member 20 is not mounted on the other side of a dividing wall between the sections 24 and 25. This gives the advantage that the drum 11 together with the driven shaft and bearing assembly 18 and the coupling member 20 can be removed as a unit from the casing 12.

In use in order to engage the driven-coupling member 20 with the drive-coupling member 21 (FIG. 1), the casing 12 containing the drum 11 is positioned over the drive-coupling member 21 and the lid 14 is placed on the drum 11, so that it abuts the top edge of the drum 11 with the lugs 30 aligned with the openings of the recesses 31. By pushing downwards on the handle 32 and turning it clockwise in the drawing, the spring 27 is compressed and the lid is locked by the lugs 30 engaging in the bayonet sockets 31. Simultaneously the driven-coupling member 20 engages with the drive-coupling member. By reversing the procedure the coupling members are disengaged and the lid can be removed.

Although two embodiments of the invention have been described, numerous variations are possible within the scope of the appended claims. For example the lid could be locked to the casing by one or more cooperating screw threads formed in the casing and the lid. It is also possible for the lid to be of such a mass that it can overcome the force exerted by the spring without the lid being locked to the casing.

We claim:

1. A domestic appliance comprising:
   a casing,
   a drum axially slidable in said casing,
   a floor of the drum,
   a driven shaft rotatably mounted in said floor,
   an end of the driven shaft remote from said drum;

a coupling member on said end;
an open end to said drum remote from said floor,
resilient means disposed between the drum and the casing ans which is effective to urge said drum and said driven shaft towards said open end,
a lid for the drum positionable to close said open end and effective to urge the drum into the casing so that said coupling member is brought into engagement with a cooperating external coupling member.

2. A domestic appliance as claimed in claim 1, in which the lid is lockable to the casing.

3. A domestic appliance as claimed in claim 2, in which the lid fits over the casing, and further comprising at least two spaced-apart bayonet recesses in the lid and at least two lugs on the casing which are shaped to be received in the recesses to lock the lid to the casing.

4. A domestic appliance as claimed in claim 2, in which the lid fits within the casing but over the drum, and further comprising at least two spaced-apart lugs on the lid and at least two bayonet recesses in the casing which are disposed to receive the lugs to lock the lid to the casing.

5. A domestic appliance as claimed in claim 1, further comprising an abutment of the casing disposed beneath said drum floor and in which said resilient means comprises a coil spring disposed between said abutment and said drum floor.